United States Patent
Fokou et al.

(10) Patent No.: US 10,830,478 B2
(45) Date of Patent: Nov. 10, 2020

(54) APPARATUS AND METHODS TO SYNCHRONIZE EDGE DEVICE COMMUNICATIONS WITH A CLOUD BROKER

(71) Applicant: General Electric Company, Schenectady, NY (US)

(72) Inventors: Leslie Fokou, San Ramon, CA (US); Bryan Rank, Modesto, CA (US)

(73) Assignee: Current Lighting Solutions, LLC, East Cleveland, OH (US)

( * ) Notice: Subject to any disclaimer, the term of this patent is extended or adjusted under 35 U.S.C. 154(b) by 0 days.

(21) Appl. No.: 15/827,862

(22) Filed: Nov. 30, 2017

(65) Prior Publication Data

US 2019/0162438 A1   May 30, 2019

(51) Int. Cl.
| | |
|---|---|
| *F24F 11/58* | (2018.01) |
| *H04L 12/28* | (2006.01) |
| *F24F 11/64* | (2018.01) |
| *H04L 29/08* | (2006.01) |
| *G05D 23/19* | (2006.01) |
| *F24F 11/56* | (2018.01) |

(52) U.S. Cl.
CPC .............. *F24F 11/58* (2018.01); *F24F 11/56* (2018.01); *F24F 11/64* (2018.01); *G05D 23/1934* (2013.01); *H04L 12/2818* (2013.01); *H04L 12/2821* (2013.01); *H04L 67/025* (2013.01)

(58) Field of Classification Search
USPC ........................................................ 700/277
See application file for complete search history.

(56) References Cited

U.S. PATENT DOCUMENTS

| | | | | |
|---|---|---|---|---|
| 2015/0167995 A1* | 6/2015 | Fadell | ...................... | F24F 11/30 |
| | | | | 700/275 |
| 2015/0350031 A1* | 12/2015 | Burks | ..................... | H04L 41/22 |
| | | | | 715/736 |

OTHER PUBLICATIONS

Tridium, "Windows and Linux versions of Niagara AX for central management and visualisation of Niagara based systems", retrived from https://www.tridium.com/~/media/tridium/library/documents/emea/tridiumeuropedatasheet_axsupervisor, on Nov. 28, 2017, 2 pages.

* cited by examiner

*Primary Examiner* — Mohammad Ali
*Assistant Examiner* — Joshua T Sanders
(74) *Attorney, Agent, or Firm* — Armstrong Teasdale LLP

(57) ABSTRACT

Example apparatus, systems and methods to communicate between a control agent and an edge device via a cloud broker are disclosed and described herein. An example apparatus includes a processor configured to receive a first instruction from a first control agent for an edge device, the first instruction associated with a first schedule of settings for a target, the target accessible via an edge device. The example processor is configured to analyze the first instruction to identify a conflict between the first instruction and a second instruction, the second instruction associated with a second control agent. When no conflict is identified, the example processor is configured to provide the first instruction to the edge device for relay to the target. When a conflict is identified between the first instruction and the second instruction, the example processor is configured to mediate the conflict and provide an outcome to the edge device.

20 Claims, 13 Drawing Sheets

APPARATUS AND METHODS TO SYNCHRONIZE EDGE DEVICE COMMUNICATIONS WITH A CLOUD BROKER

FIELD

The present disclosure generally relates to apparatus, systems, and methods for communication synchronization and, more particularly, to apparatus, systems, and methods for synchronizing edge device communications with a cloud broker.

BACKGROUND

Heating, ventilation, and air conditioning (HVAC) controls govern the climate inside buildings and other facilities (e.g., climate control or energy management). HVAC management involves regulation of heating systems, radiators, chimneys, ventilators, air conditioners, humidifiers, dehumidifiers, air filters, and the like. HVAC management helps a building to be operated in a safe and comfortable way for the people (and equipment) inside the building. While HVAC controls tie in to electrical systems, mechanical systems, and electromechanical systems, setting and maintenance of HVAC controls continues to be a very manual, trial-and-error based endeavor leading to delays, inaccurate results, and little or no coordination of control.

BRIEF SUMMARY

In view of the above, apparatus, systems, methods, and computer program products which improve communication between a control agent and an edge device via a cloud broker are provided. The above-mentioned needs are addressed by the subject matter described herein and will be understood in the following specification. This summary briefly describes aspects of the subject matter described below in the Detailed Description, and is not intended to be used to limit the scope of the subject matter described in the present disclosure.

Certain examples provide an apparatus including a cloud broker including a processor and a memory. The example processor is configured to at least receive a first instruction from a first control agent for an edge device, the first instruction associated with a first schedule of settings for a target, the target accessible via an edge device. The example processor is configured to at least analyze the first instruction to identify a conflict between the first instruction and a second instruction, the second instruction associated with a second control agent. When no conflict is identified, the example processor is configured to at least provide the first instruction to the edge device for relay to the target for execution. When a conflict is identified between the first instruction and the second instruction, the example processor is configured to at least mediate the conflict and provide an outcome to the edge device.

Certain examples provide a tangible computer-readable storage medium including instructions which, when executed, particularly program a processor in a cloud broker. The example processor is configured to at least receive a first instruction from a first control agent for an edge device, the first instruction associated with a first schedule of settings for a target, the target accessible via an edge device. The example processor is configured to at least analyze the first instruction to identify a conflict between the first instruction and a second instruction, the second instruction associated with a second control agent. When no conflict is identified, the example processor is configured to at least provide the first instruction to the edge device for relay to the target for execution. When a conflict is identified between the first instruction and the second instruction, the example processor is configured to at least mediate the conflict and provide an outcome to the edge device.

Certain examples provide a computer-implemented method including receiving, at a cloud broker, a first instruction from a first control agent for an edge device, the first instruction associated with a first schedule of settings for a target, the target accessible via an edge device. The example method includes analyzing, at the cloud broker, the first instruction to identify a conflict between the first instruction and a second instruction, the second instruction associated with a second control agent. The example method includes, when no conflict is identified, providing, via the cloud broker, the first instruction to the edge device for relay to the target for execution. The example method includes, when a conflict is identified between the first instruction and the second instruction, mediating, via the cloud broker, the conflict and provide an outcome to the edge device.

Figure 1:
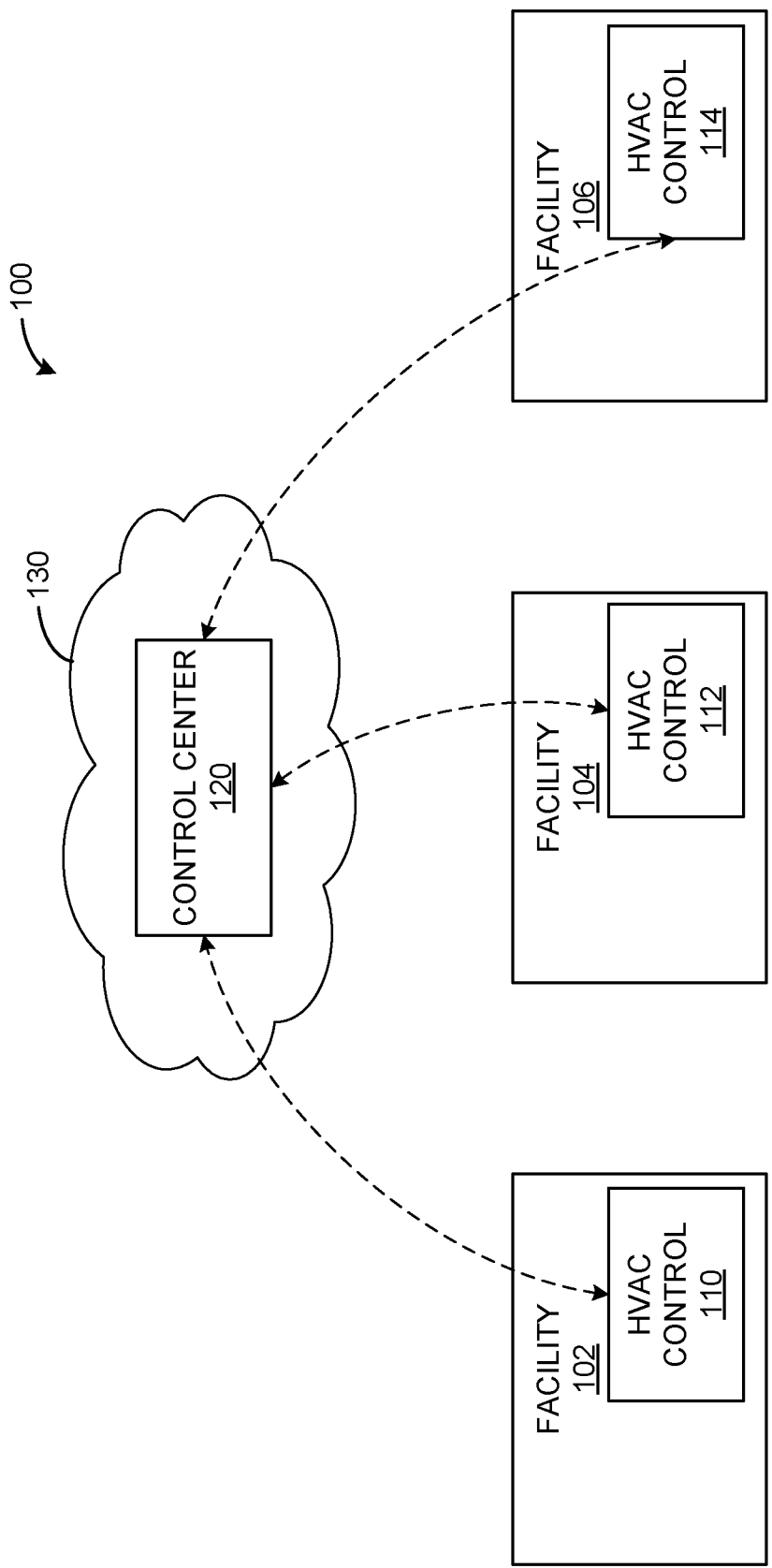
FIG. 1 illustrates an example system including heating, ventilation, and air conditioning (HVAC) control subsystems in communication with a control center in a cloud-based environment.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

In addition, it should be understood that references to "one embodiment" or "an embodiment" of the present disclosure are not intended to be interpreted as excluding the existence of additional embodiments that also incorporate the recited features.

Certain examples provide apparatus, systems, and methods for edge device and cloud schedule synchronization. Certain examples facilitate schedule synchronization for building environmental systems such as heating, ventilation, and air conditioning (HVAC) systems, etc. Certain examples enable automated discovery of edge device schedules through a network such as a secured Modbus network, a Building Automation and Control network (BACnet), another industrial electronics communication protocol, etc. Discovered schedules can then be automatically imported into a cloud scheduling application and vice-versa, allowing both cloud and edge schedules to remain in synchrony. As described herein, discoverable schedules can be reoccurring and/or override schedules running on a wide array of sensors and assets, for example.

Given that sensors and assets (e.g., equipment, infrastructure, control system, etc.) can often be controlled by independent third party applications running on premise and/or remotely, it becomes very important to allow all authorized controlling agents to remain in synchrony. Synchronizing controllers and associated schedules reduces a probability that an application can blindly intrude on another application's edge schedule(s). Synchronization also helps prevent high priority and unmodifiable schedules from being overridden or deleted, for example.

In certain examples, edge device asset schedules can be securely discovered. In certain examples, independent scheduling applications can be kept in sync with a given asset schedule, as well as in sync with each other from the viewpoint of a target asset. Certain examples broker potential scheduling control conflicts between devices, for example.

In certain examples, a scheduling broker application executes on a cloud-based system. The example scheduling broker application includes a set of application programming interfaces (APIs) that can be used to query, update, create, and/or delete (CRUD) and/or otherwise interact with configuration information such as HVAC set points, HVAC schedules, etc. For example, a set point or setpoint can specify a value (e.g., a temperature value), a time, another setting, etc. In certain examples, the scheduling broker can promptly receive CRUD and/or other setting details for set points, schedules, etc., via a queue.

Additionally, a light-weight module running on an edge device can receive and apply set points and schedule actions through edge device firmware, for example. The edge device module can then securely report success and failure of such operation in a format processible by the cloud scheduling broker application, for example.

Thus, the cloud scheduling broker, edge device, and independent control agents interact, with the control agents seeking to leverage the edge device to apply set points, schedules, etc., on the edge device for relay to the cloud. In certain examples, the edge device includes a gateway device, such as an Internet-of-Things (IoT) gateway (e.g., a Modbus- and/or BACnet-capable IoT gateway, etc.), etc.

Certain examples provide technological improvement in the form of an advanced architecture including: a) a gateway or edge device (e.g., a Modbus- and/or BACnet-capable IoT gateway, etc.), b) a message broker or queuing engine, c) and one or more scheduling cloud applications. Communication between the gateway, message broker, and cloud scheduling applications can be facilitated through a secure communication channel such as a two-way transport layer security (TLS) encrypted channel and a secure network, for example.

In certain examples, the IoT gateway (edge device) controls many assets and sensors on premise. When a recurring and/or override schedule is created, updated or deleted (CRUD) by a local and/or external application, a custom plug-in running on the IoT gateway detects the change and publishes a message to a queue. The published message includes schedule details, as well as metadata such as schedule external reference identifier, author information, etc. Schedule authors can include a person or application acting on-site, as well as a remote application, for example. Next, authorized cloud applications consume schedule messages from the queue. Given the metadata information contained in each message, each application is able to filter schedules authored by external agents and apply the same change locally, for example.

As shown in the example energy management system (EMS) 100 of FIG. 1, a plurality of facilities 102-106 include heating, ventilation, and air conditioning (HVAC) control subsystems 110-114 in communication with a control center 120 in a cloud-based environment 130. The HVAC control subsystems 110-114 communicate with the control center 120 to receive settings, parameters, commands, instructions, etc., and/or to provide log files, feedback, status updates, etc.

For example, temperature controls, fan controls, pressure controls, etc., can be received from the control center 120. For example, temperature controls provide limit or temperature control in one or more areas of the facility 102-106. Fan controls can adjust fan motor speed, for example. Pressure controls regulate compressor activity, oil pressure safety, condenser fan cycling, etc. Such controls can operate locally (e.g., via local control at the site 102-106, etc.) and/or remotely (e.g., centralized, scheduled, and/or otherwise programmatic control via the control center 120, etc.) to regulate operation of a heating and/or air conditioning system. In certain examples, a sensor is used to compare an observed state (e.g., a current measured temperature, pressure, etc.) with a target state (e.g., a desired or otherwise selected/specified temperature, pressure, etc.). The control center 120 and/or local HVAC control 110-114 can specify the target state, and the local HVAC control 110-114 can react to the measured difference between observed state and target state to take action to reach and/or otherwise maintain the target state (e.g., start a blower, reduce pressure, trigger a fan, heat, cool, etc.).

Figure 2:
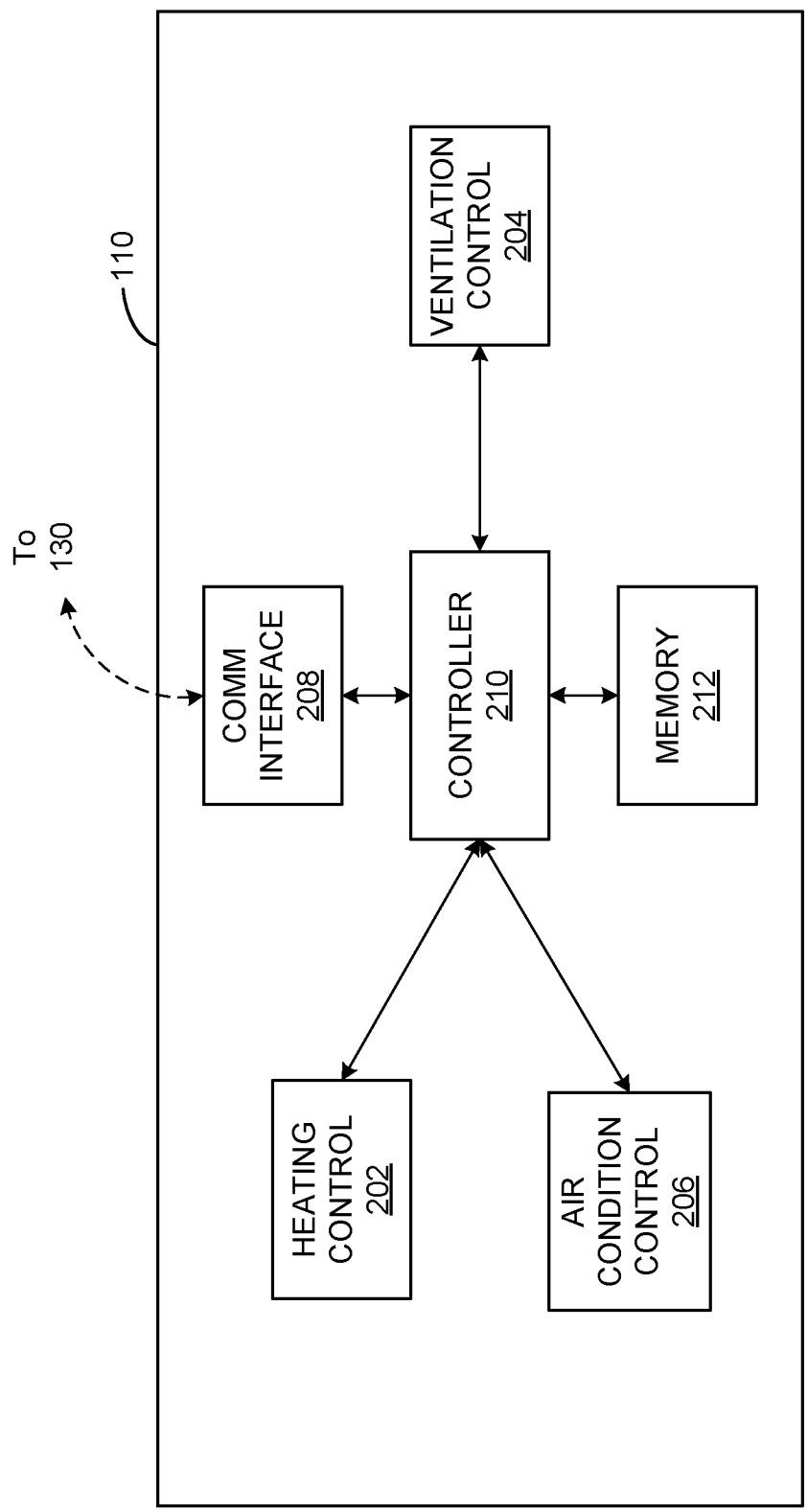
FIG. 2 shows an example implementation of the HVAC control subsystem of the example of FIG. 1.

As shown in the example of FIG. 2, an implementation of the example HVAC control subsystem 110 includes a heating control 202, a ventilation control 204, an air conditioning control 206, a communication interface 208, and a controller 210, and a memory 212. While the HVAC control subsystem 110 is shown in the example of FIG. 2, the drawing and description can also apply to subsystems 112, 114. As discussed above with respect to FIG. 1, a local action, sensor measurement, trigger, etc., can trigger action by one or more of the heating control 202, ventilation control 204, or air conditioning control 206. For example, a sensor measurement and/or selection through a touchscreen, keypad, knob, dial, button, etc., can be received through the communication interface 208 and provided to the controller 210 to trigger one or more of the heating control 202, ventilation control 204, or air conditioning control 206. Alternatively or in addition, command(s) from the control center 120 in the cloud 130 can be received via the communication interface 208 and provided to the controller 210 to trigger one or more of the heating control 202, ventilation control 204, or air conditioning control 206, for example. Commands, settings, logs, etc., can be stored in the memory 212 for use by the controller 210, heating control 202, ventilation control 204, and/or air conditioning control 206, for example.

Figure 3:
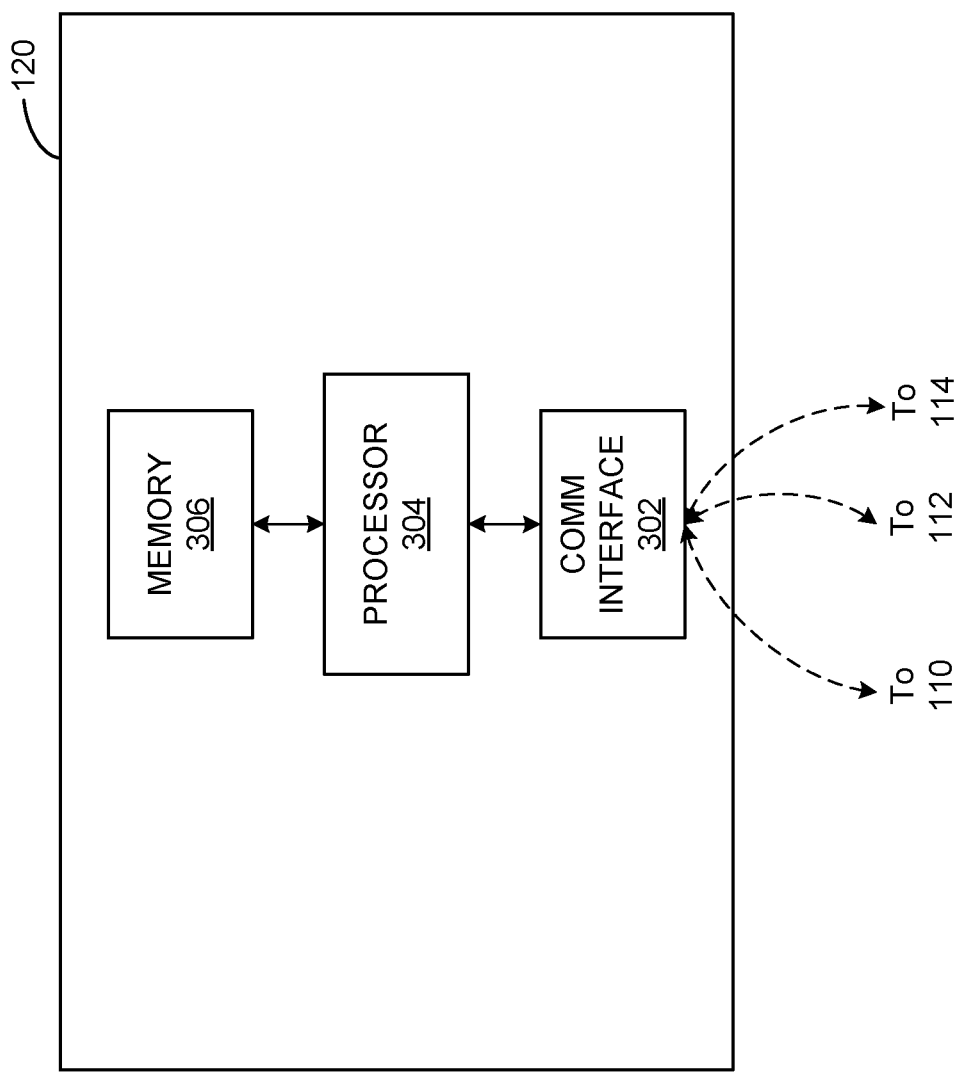
FIG. 3 shows an example implementation of the control center of the example of FIG. 1.

As shown in the example of FIG. 3, an implementation of the example control center 120 includes a communication interface 302, a processor 304, and a memory 306. The communication interface 302 (e.g., a wireless communication interface such as cellular, Wi-Fi, and/or other mobile communication interface) sends instructions and receives feedback from external devices such as the HVAC controls 110-114. The memory 306 stores instructions, data, logs, programs, etc., to enable the processor 304 to instruct, trigger, and/or otherwise control the HVAC controls 110-114 for each facility 102-106.

Figure 4:
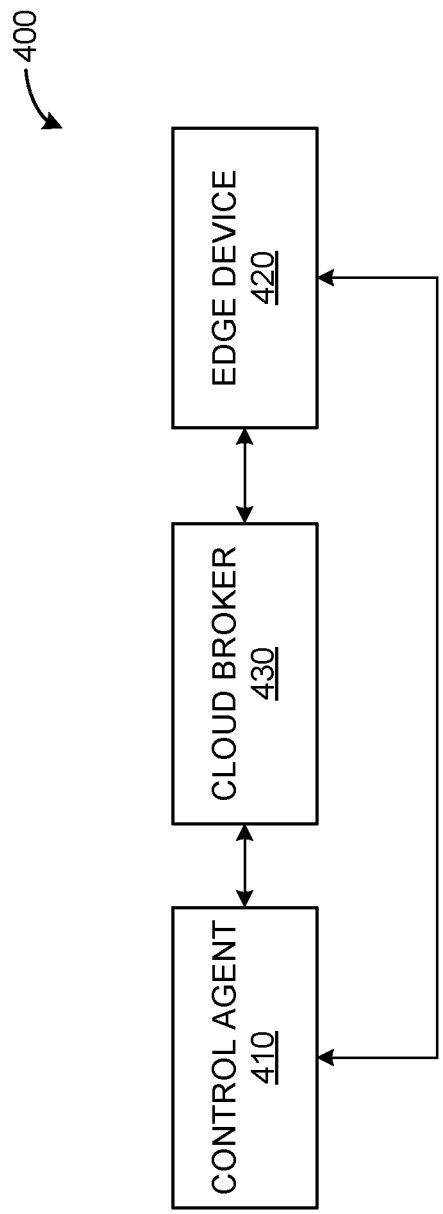
FIG. 4 illustrates an example system configuration including a control agent, an edge device, and a cloud broker.

FIG. 4 illustrates an example system configuration 400 including a control agent (e.g., a HVAC control 110-114, third party application, control device, etc.) 410, an edge device (e.g., gateway, router, etc.) 420, and a cloud broker 430 (e.g., a cloud scheduling application broker, etc.). As shown in the example of FIG. 4, the control agents 410 can communicate directly with the edge device 420 and/or via the cloud broker 430 to the edge device 420. Thus, the control agent 410 can communicate a schedule, set point, and/or other instruction, data, etc., directly to the edge device 420 connected to an environment system (e.g., HVAC controller, etc.) to be controlled and/or can route information through the cloud broker 430, which can synchronize schedules, set points, and/or other information to be sent to the edge device 420, for example.

Figure 5:
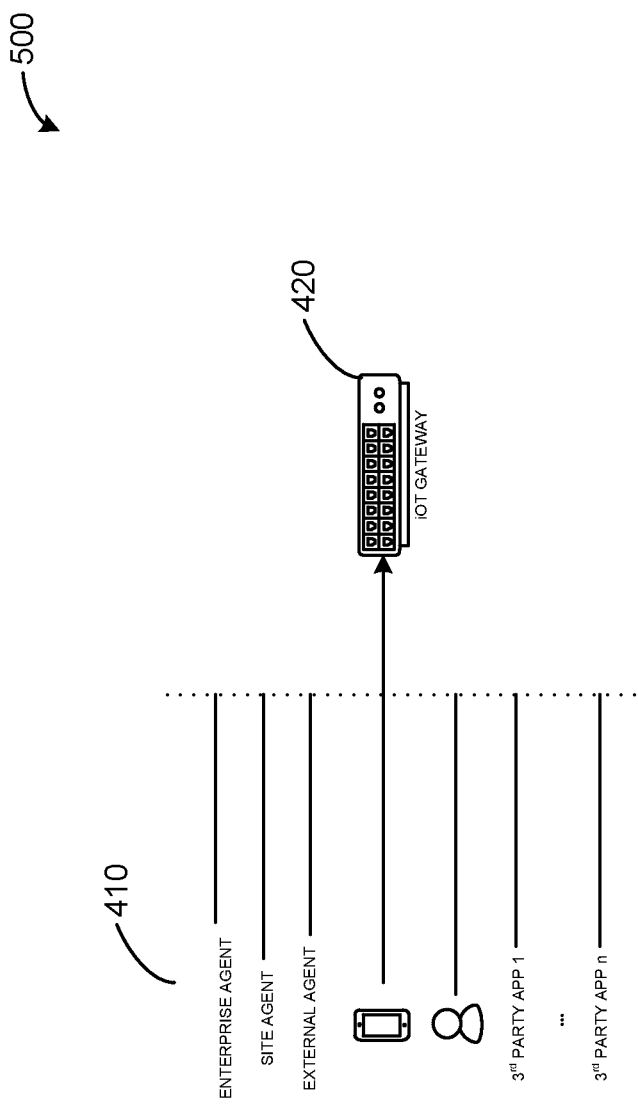
FIG. 5 illustrates a configuration in which multiple control agents communicate directly with an edge device.

FIG. 5 illustrates problems posed by a prior approach to agent 410—edge device 420 communication. As shown in the example configuration 500, each available control agent 410 communicates directly with the edge device 420 without awareness of schedule and/or set point actions provided by other agent(s) 410 to the edge device 420. The edge device 420 is unable to make an informed decision when overriding a set point value, creating a schedule, etc.

Figure 6:
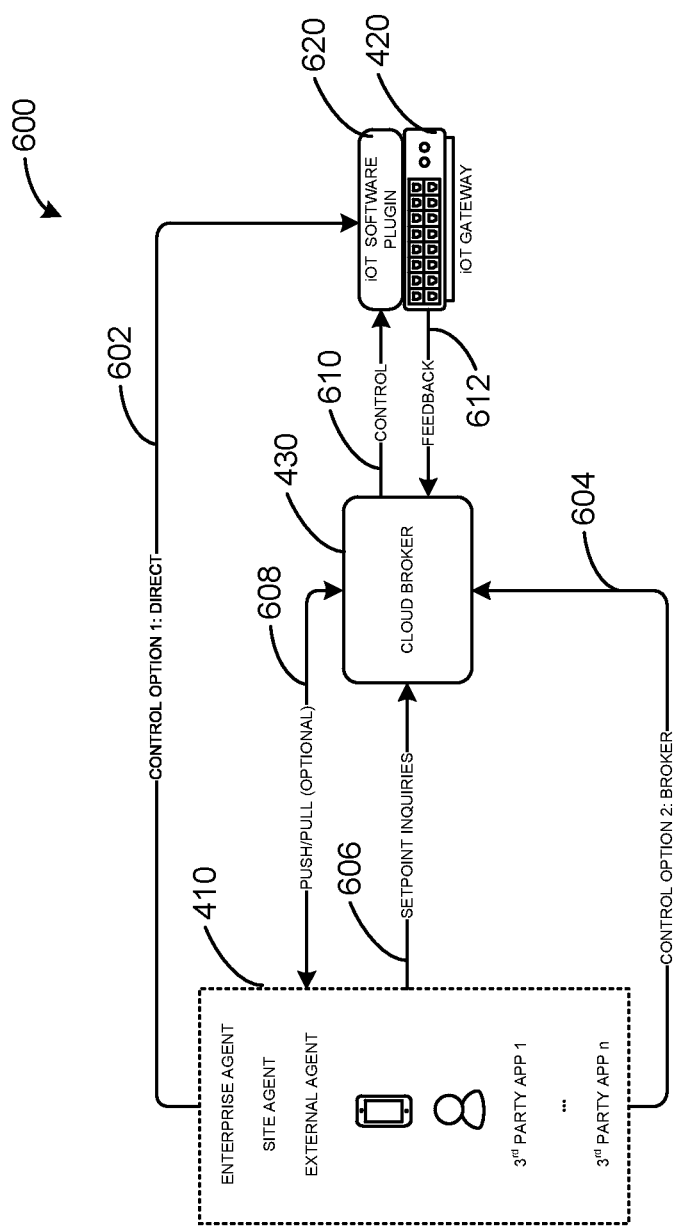
FIG. 6 illustrates an implementation of the example system configuration of FIG. 4.

FIG. 6 illustrates an implementation 600 of the example system configuration 400 of FIG. 4. FIG. 6 includes the control agent 410, edge device 420, and cloud broker 430 and addresses the deficiencies of FIG. 5, for example. As shown in the example of FIG. 6, a first control option 602 facilitates direct communication between the control agent 410 and the edge device (IoT gateway with software plugin, etc.) 420. A second control option 604 interacts with the cloud broker 430 to synchronize schedule and/or other communication between agents 410 and the edge device 430.

Using direct control 602, the control agent 410 sends instructions such as an HVAC schedule, setpoint, etc., directly to the edge device 420 for communication to the HVAC control 110-114, for example. However, the second control option 604 introduces the cloud broker 430 into the communication and control path and provides technological improvements and advantages to schedule disambiguation, coordination, priority, and other HVAC system control, for example.

As shown in the example configuration 600 of FIG. 6, each control agent utilizing indirect or broker-based control 604 sends communication, including schedule, setpoint inquiry 606, etc., to the cloud broker 430. In some examples, the cloud broker 430 can push to and/or pull from information from the control agent 410 facilitate control transmission to the edge device 420. The cloud broker 430 sends control information 610 to the edge device (e.g., to a software plugin 620 running at the edge device gateway 420, etc.) for routing to the application HVAC control(s) 110-114, for example. The edge device 420 provides feedback 612 based on the control content, execution at the HVAC control(s) 110-114, feedback from the HVAC control(s) 110-114, etc.

Thus, the cloud broker 430 provides a scheduling broker application running on the cloud to provide APIs to receive and/or query for setpoints, schedules, etc., as well as to create, update, and/or delete (CRUD) such setpoints, schedules, etc. The cloud broker 430 receives set point, schedule, and/or other CRUD details via a queue quickly (e.g., in real time nearly instantly accounting for data transmission, processing, and/or storage latency, for example).

In certain examples, such as shown in the example of FIG. 6, a lightweight module or software plugin 620 runs on the edge device 420 to allow the edge device gateway 420 to receive and apply setpoint(s), schedule action(s), and/or other command(s) to facility(-ies) 102-106 and/or their associated HVAC control(s) 110-114 through edge device 420 firmware. The plugin 620 enables the edge device 420 to securely report back successes and failures of scheduling and/or other operations in a format understandable by the cloud broker 430, for example. The cloud broker 430 thus synchronizes control agents 410 and keeps the control agents 410 in synchronization while brokering potential conflicts with schedule, set point, and/or other instruction to the edge device 420, for example.

Figure 7:
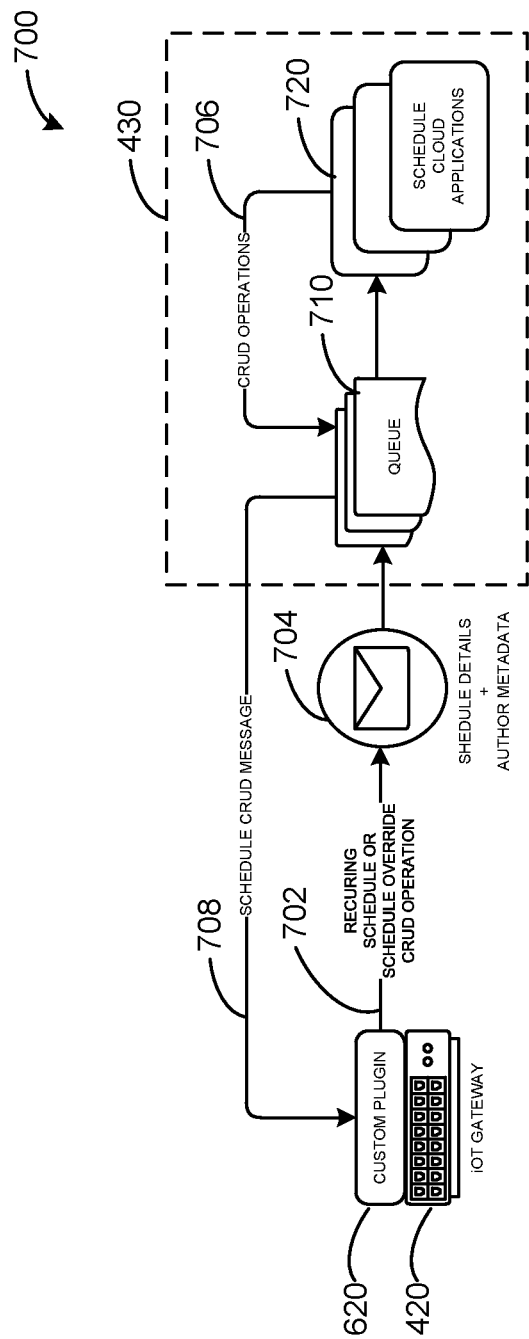
FIG. 7 illustrates an example architecture for the edge device of FIG. 4 to facilitate automated discovery of schedules.

FIG. 7 illustrates an example architecture 700 for the edge device 420 to facilitate automated discovery (auto-discovery) of schedules. As shown in the example of FIG. 7, the architecture apparatus 700 includes the edge device 420 with plugin 620 communicating with the cloud broker 430. The example cloud broker 430 of FIG. 7 includes a queue 710 and one or more schedule cloud applications 720. The example plugin 620 transmits a recurring schedule and/or schedule override CRUD operation message 702 including schedule details, author metadata, etc., 704 to the queue 710 of the cloud broker 430. The queue 710 provides the message content 704 to a schedule cloud application 720, which can implement CRUD operations with respect to information in the queue 710, for example. The queue 710 generates a schedule CRUD message for the plugin 620 of the edge device 420, for example. In certain examples, communication between the edge device 420 and the cloud broker 430 occurs via a 2-way TLS encrypted channel and a secure network.

In certain examples, the IoT gateway edge device 420 controls many assets and sensors on premise (e.g., for a facility 102-106, etc.). When a recurring or override schedule is created, updated or deleted 702 by a local and/or an external application, the custom plugin 620 running on the iOT gateway edge device 420 detects the change and publishes a message 702 to the queue 710. The published message 702 includes schedule details 704, as well as metadata such as schedule external reference identifier, author information, etc. Schedule authors can include a person or application acting on-site, as well as a remote application, etc. Authorized cloud applications consume schedule messages from the queue 710. Given the metadata information contained in each message, each schedule cloud application 720 is able to filter schedules authored by external agents, and apply the same change locally, for example.

In certain examples, the cloud broker 430 works with the edge device 420 to synchronize and facilitate coordinated scheduling. Building and/or other facility environmental control software (e.g., GE Intelligent Environment Software (GEIES), etc.) can be used to manage energy producing and consuming assets at customer sites 102-106, for example. In certain examples, the environmental control software can be configured to include a cloud/enterprise configuration and an edge/site execution component. Edge/site component(s) can coexist at a site 102-106 with other edge software such as HVAC control 110-114 control software, etc.

Since other edge software configuration lifecycles can occur at different times, by separate vendors, with little or no inter-communication between parties, brokering potential control-conflicts in each component is required. If control conflicts are not identified and addressed, the edge component software modules are likely to become unstable and affect one another in unexpected, unpredictable ways.

To solve this problem, certain examples provide the cloud broker 430 to identify and mediate control conflicts for the edge device 420. For example, HVAC schedules can be synchronized. In such examples, a timeline or sequence of events is significant because the ordering of configuration changes is significant to the performance of the software.

Thus, a brokering agent can order configuration changes for the edge device 420 (e.g., for applications executing on the edge device 420, etc.).

Figure 8:
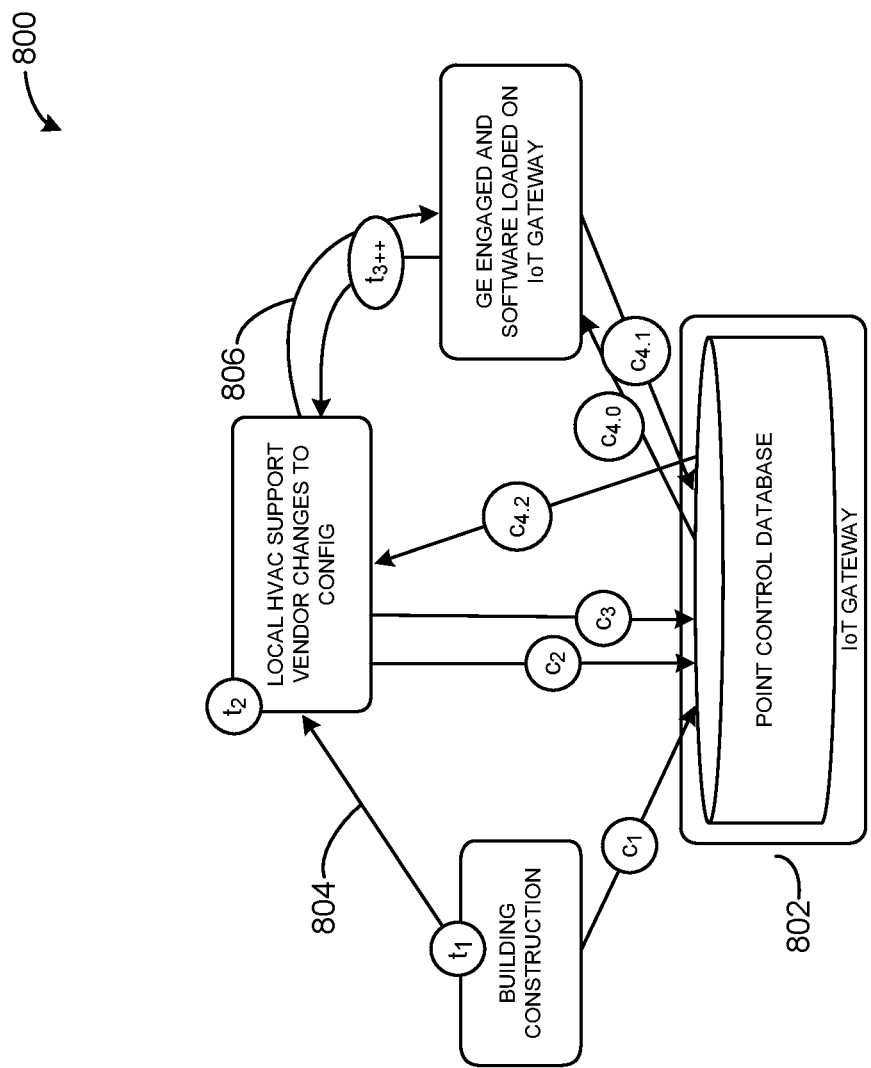
FIG. 8 illustrates an example process for HVAC coordination and configuration.

FIG. 8 illustrates an example process 800 for HVAC coordination and configuration. At timeline mark t1, site/building construction occurs. During construction, weekday and weekend control schedules are implemented via a software module packaged with the four rooftop HVAC units by a regional HVAC installation contractor, for example. At control point c1, an initial gateway control schedule configuration is provided to a point control database 802 at the IoT gateway edge device 420.

At 804, control is handed over to a local HVAC support service. At timeline mark t2, representing an initial five years following construction, the local HVAC contractor maintains edge schedules as part of ongoing support contract, for example. the local contractor is licensed to use a configuration user interface for normal operations. The contractor can make several changes over the years, mainly to accommodate local operational requirements, for example. At control point c2, the local contractor assumes control of initial commissioning. At control point c3, the local contractor provides operational updates to scheduling control.

At 806, a cloud provider can engage while local contractor engagement continues. At timeline mark t3, five years later, environmental controls are integrated with an existing site configuration. While legacy control schedules must continue to "exist" as they represent the current (and future) on-site asset control policy (e.g., set by local HVAC contractor), no provision for coordination with legacy control schedule or local HVAC contractor is within project scope. Certain examples "adjust" schedule policies to, for example, coordinate performance of assets, reduce energy consumption at costly times, comply with cost cutting opportunities issued dynamically from the utility company, etc. These "scheduling adjustments" are visible to the local contractor without access to cloud software and without access to proprietary interfaces. In this example scheduling software coordinates with the lowest common software scheduling APIs. Updates and changes are made visible in native scheduling APIs. The cloud-based logic 430 which brokers edge and cloud control remains the same. Updates to edge schedules made by third party software modules are detected by edge components 420. Schedule updates can be published as alarms that alert operational personnel to potential conflict, and/or routed to rules processing that programmatically manages detected conflicts, if possible, for example.

At control point c4.0, an initial read of the existing point control configuration database 802 is provided from the gateway 420. At control point c4.1, updates are onboarded to the initial point control configuration database 802. At control point c4.2, a local contractor read of updated scheduling information is provided from the point control configuration database 802.

Thus, as shown in the example of FIG. 8, a plurality of control timelines and point control configurations can be shared and coordinated via the database 802 on the edge device 420. After initial configuration and development, control can be facilitated as ongoing shared simultaneous control responsibility between the local HVAC contractor and the cloud broker 430. Supported edge devices 420 provide communication to the cloud 430 through a network and/or a queuing protocol, such as hypertext transfer protocol (HTTP), advanced message queuing protocol (AMQP), message queue telemetry transport (MQTT), etc. Edge device schedules are readable through any network or queuing protocol to provide alerts upon detection of scheduling conflicts and facilitate mediation of scheduling conflicts among parties using the API.

Certain examples enable retrieval of setpoints and schedules (e.g., in a JavaScript Object Notation (JSON) format, etc.) through APIs and/or through a queue, etc. Certain examples help mediate scheduling conflicts by sending immediate success or failure feedback. By sending immediate success/failure feedback, schedule authors can instantly know whether or not their action was successful, and they can take appropriate subsequent action if needed.

In certain examples, the cloud broker 430 maintains a cloud schedule. For example, the cloud broker 430 can maintain a global or cloud schedule incorporating schedule, setpoint, and/or other instruction information into one synchronized schedule for connected control agents 410 and the edge device 420. Thus, control agents 410 can subscribe to and/or otherwise query the cloud schedule via the cloud broker 430 to determine instructions going to the edge device 420, delayed, refused, adjusted, etc.

While example implementations of the energy management system and associated controllers/processors are illustrated in FIGS. 1-8, one or more of the elements, processes and/or devices illustrated in FIGS. 1-8 may be combined, divided, re-arranged, omitted, eliminated and/or implemented in any other way. Further, the example HVAC control 110-114, control center 120, control agent 410, edge device 420, cloud broker 430, and/or subcomponents thereof can be implemented by hardware, software, firmware and/or any combination of hardware, software and/or firmware. Thus, for example, any of the example HVAC control 110-114, control center 120, control agent 410, edge device 420, cloud broker 430, and/or subcomponents thereof can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HVAC control 110-114, control center 120, control agent 410, edge device 420, cloud broker 430, and/or subcomponents thereof is/are hereby expressly defined to include a non-transitory computer readable storage device or storage disk such as a memory, a digital versatile disk (DVD), a compact disk (CD), a Blu-ray disk, etc. including the software and/or firmware. Further still, the example HVAC control 110-114, control center 120, control agent 410, edge device 420, cloud broker 430, and/or subcomponents thereof may include one or more elements, processes and/or devices in addition to, or instead of, those illustrated in FIGS. 1-8, and/or may include more than one of any or all of the illustrated elements, processes and devices.

Figure 9:
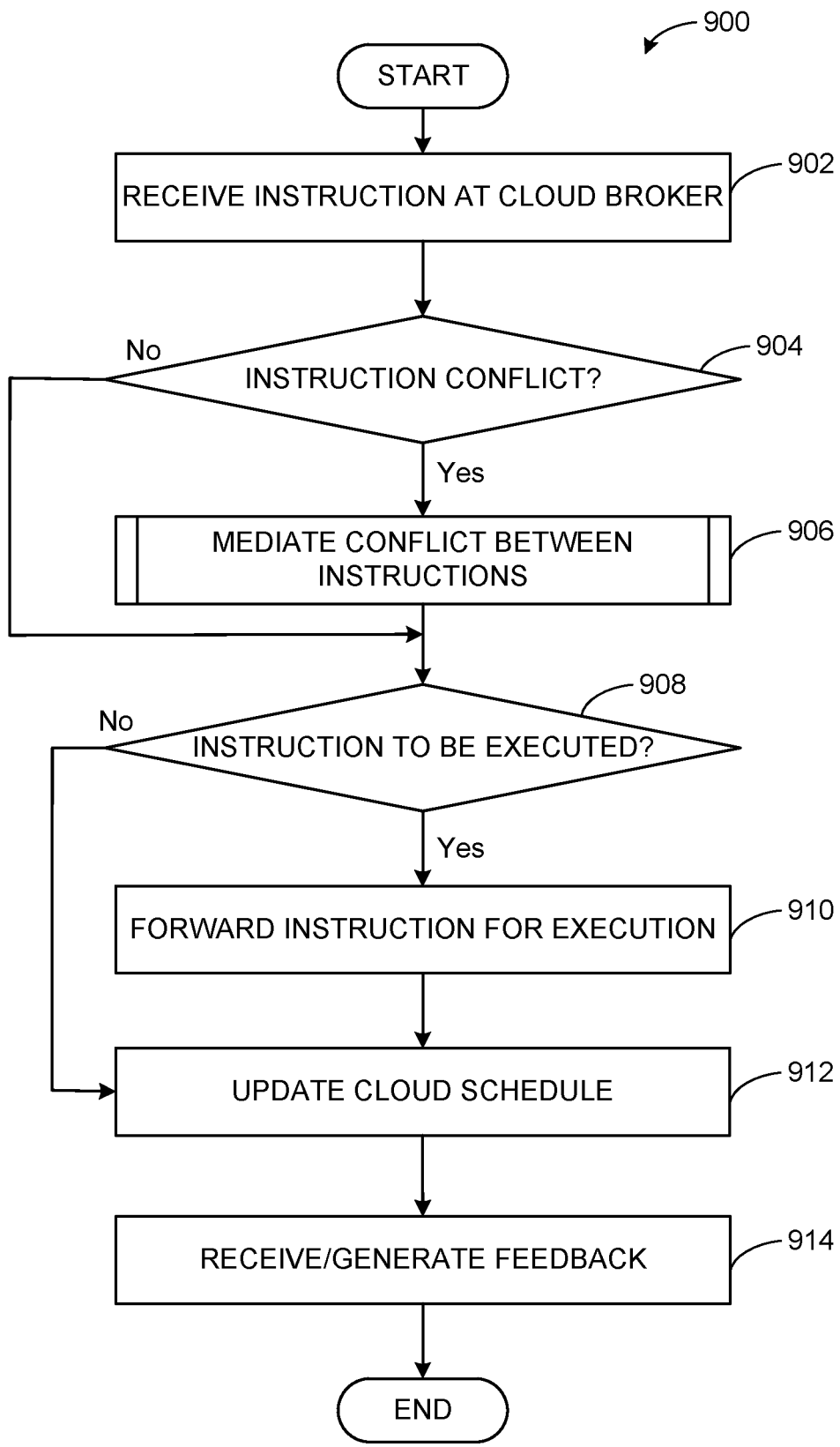
FIGS. 9-10 illustrate example flow diagrams of an example process for communication and control between control agent(s), the cloud broker, and the edge device of FIGS. 1-8.
Figure 10:
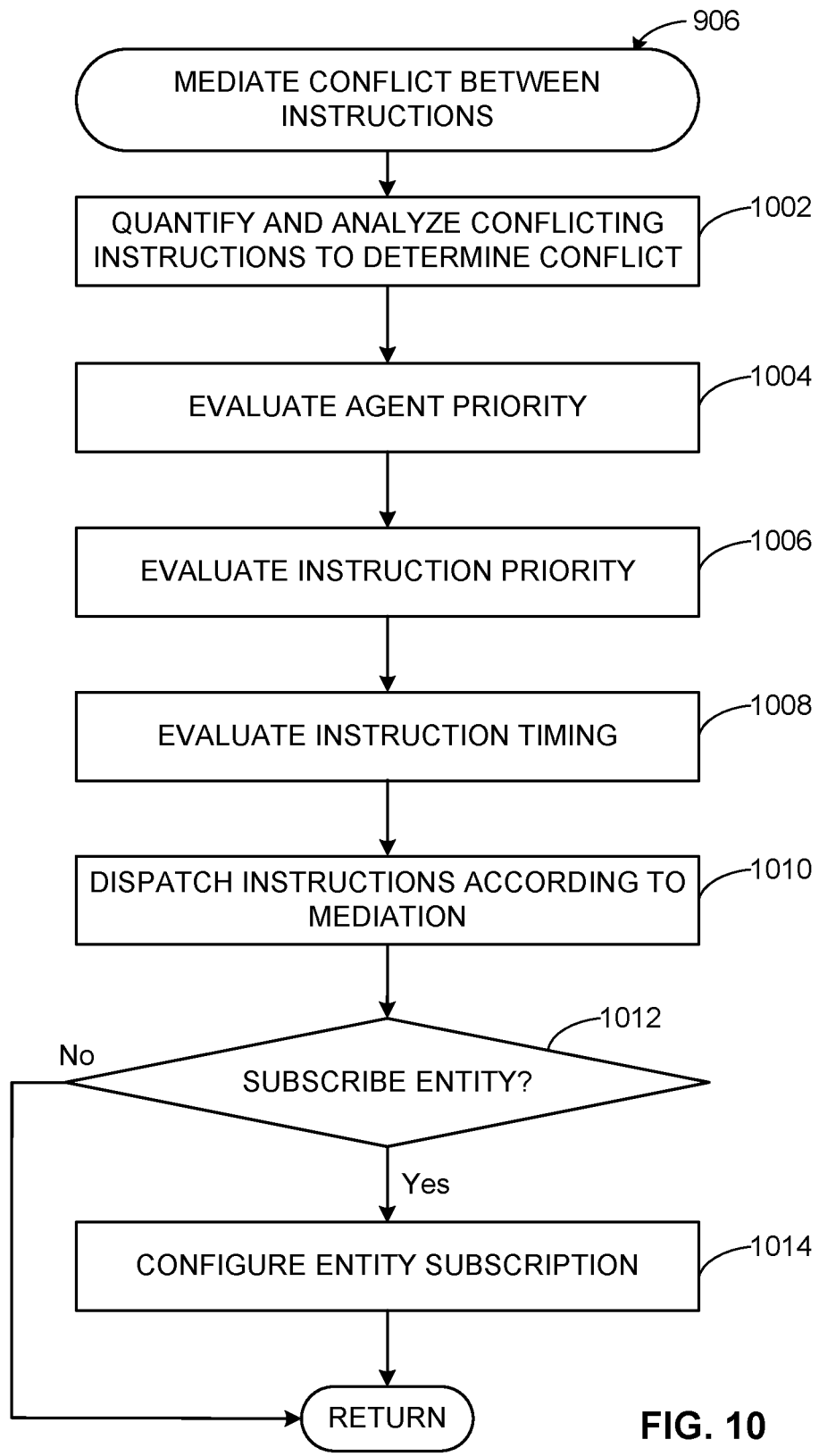

Flow diagrams representative of example machine readable instructions for implementing the example HVAC control 110-114, control center 120, control agent 410, edge device 420, cloud broker 430, and/or subcomponents thereof of FIGS. 1-8 are shown in FIGS. 9-10. In these examples, the machine readable instructions comprise a program for execution by a processor such as a processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9-10, many other methods of implementing the example HVAC control 110-114, control center 120, control agent 410, edge device 420, cloud broker 430, and/or subcomponents thereof can alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9-10 can be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 9 illustrates a flow diagram of an example process 900 for communication and control between control agent(s) 410, the cloud broker 430, and the edge device 420 of FIGS. 1-8. For example, the cloud broker 430 receives communication from the control agents 410 (e.g., setpoint request, schedule information, etc.) and mediates conflicts between communications to the edge device 420 before relaying the communication to the edge device 420.

At block 902, a message including an instruction is sent from the control agent 410 to the cloud broker 430. For example, a setpoint inquiry, a schedule, etc., can be transmitted from the control agent 410 (e.g., enterprise agent, site agent, external agent, mobile device, third party application, etc.) to the cloud broker 430 for the edge device 420.

At block 904, the cloud broker 430 evaluates the received instruction for conflicts. For example, if two control agents 410 have sent HVAC schedule commands for the same HVAC control 110-114 via the edge device 420, the cloud broker 430 can identify that the HVAC schedules conflict (e.g., different temperature set points for the same time period, different time periods for the same temperature, different temperature sequences over the overlapping time periods, etc.).

If a conflict is identified, then, at block 906, the conflict between instructions is mediated. For example, conflicting instructions are quantified and analyzed to determine the conflict (e.g., the type of conflict, extent of the conflict, entities involved in the conflict, etc.). Thus, a conflict can be broken down into parts and organized for analysis.

An entity associated with each conflicting instruction can be compared to determine priority (e.g., by processing and comparing metadata identifying the entity in conjunction with the instruction message, etc.). For example, a local contractor can preempt a cloud operator because the local contractor is working to resolve a problem on the local system 110-114.

A priority previously associated with each instruction can be compared to determine which instruction is executed or executed first. For example, a particular setpoint instruction can have a higher priority than an HVAC schedule, or vice versa, which triggers the cloud broker 430 to prioritize and pass through the higher priority instruction to the edge device 420.

In certain examples, entities use a cloud scheduling service to issue setpoints associated with a priority, which can be used to determine what is scheduled first (e.g., passed through to the edge device 420 for the HVAC control 110-114, etc.). For example, a lower number can indicate a higher priority (e.g., 3-2-1, etc.), and that priority can be used to determine which instruction is passed through to the HVAC control 110-114 first. In certain examples, if two events are scheduled with the same priority, time stamps associated with the corresponding messages can be evaluated, and the message with latest time stamp can be executed first.

In certain examples, a type of event/instruction is evaluated to allow "important" events to take priority over other events. For example, algorithms seeking to optimize energy consumption are secondary to main response events.

In certain examples, entities can subscribe to the cloud broker 430 such that subscribers receive notification of events such as notification of changes made at the edge device 420 by a second entity to a schedule set by a first entity at the edge device 420. The first entity then knows what has been affected and can take action and/or otherwise respond accordingly.

Setpoint inquiries can periodically be sent by the control agent 410, and the cloud broker 430 respond with a corresponding setpoint so that the agent 410 can determine whether or not the setpoint is different than expected, for example. In certain examples, in response to a setpoint inquiry, the cloud broker 430 notifies the control agent 410 that its schedule may not be applied due to another schedule with higher priority on the same edge device gateway 420, so the control agent 410 is advised not to forward the schedule to the edge device 420 because the schedule will not be allowed to pass through. Then, when the edge device 420 is available, the cloud broker 430 can notify the control agent 410 to now provide its schedule, if still applicable, to the edge device 420 for execution, and the cloud broker 430 can return a response (e.g., in real time or substantially in real time given data transmission, processing, and/or storage latency) informing the control agent 410 of the success or failure of the proposed schedule, for example.

Thus, a control agent 410 can receive push notifications from the cloud broker 430 regarding activity of other agents 410. The particular agent 410 can learn from what other agents 410 are doing and whether or not their action is successful, for example. Alerts can be sent in the form of visual, audible, email, text, and/or code/instruction to the agent 410, for example.

At block 908, the instruction is evaluated to determine if the instruction is to be executed. For example, if the mediation resulted in the instruction being canceled, overridden, postponed, etc., then the instruction may not be implemented (e.g., passed on to the edge device 420 for execution with respect to the HVAC control 110-114, etc.). The control agent 410 sending the instruction can be told not to send, to wait/delay, and/or to otherwise withdraw the instruction, for example. Otherwise, if the instruction is to be implemented, then, at block 910, the instruction is forwarded for execution. For example, an HVAC schedule is forwarded to the edge device 420 for execution by a corresponding HVAC control 110-114, etc.

At block 912, a cloud schedule is adjusted. For example, the cloud broker 430 can maintain a global or cloud schedule incorporating schedule, setpoint, and/or other instruction information into one synchronized schedule for connected control agents 410 and the edge device 420. Thus, control agents 410 can subscribe to and/or otherwise query the cloud schedule via the cloud broker 430 to determine instructions going to the edge device 420, delayed, refused, adjusted, etc.

At block 914, feedback is provided to the cloud broker 430 and/or control agent 410. For example, if the instruction was not executed/forwarded for execution, the control agent 410 is notified of the lack of execution, requested to resend later, etc. If the instruction was sent for execution, the control agent 410 and/or cloud broker 430 can be notified of the success or failure of that execution, for example.

FIG. 10 illustrates an example implementation of block 906 of FIG. 9 to mediate a conflict between instructions for the edge device 420. At block 1002, conflicting instructions are quantified and analyzed to determine the conflict (e.g., the type of conflict, extent of the conflict, entities involved in the conflict, etc.). Thus, a conflict can be broken down into parts and organized for analysis.

At block 1004, a priority associated with a corresponding control agent 410 issuing each confliction instruction is determined. For example, entities associated with each conflicting instruction can be compared to determine priority (e.g., by processing and comparing metadata identifying the entity in conjunction with the instruction message, etc.). For example, a local contractor can preempt a cloud operator because the local contractor is working to resolve a problem on the local system 110-114.

At block 1006, a priority associated with each conflicting instruction is evaluated. In certain examples, a type of event/instruction is evaluated to allow "important" events to take priority over other events. For example, algorithms seeking to optimize energy consumption are secondary to main response events.

A priority previously associated with each instruction can be compared to determine which instruction is executed or executed first. For example, a particular setpoint instruction can have a higher priority than an HVAC schedule, or vice versa, which triggers the cloud broker 430 to prioritize and pass through the higher priority instruction to the edge device 420.

In certain examples, entities use a cloud scheduling service to issue setpoints associated with a priority, which can be used to determine what is scheduled first (e.g., passed through to the edge device 420 for the HVAC control 110-114, etc.). For example, a lower number can indicate a higher priority (e.g., 3-2-1, etc.), and that priority can be used to determine which instruction is passed through to the HVAC control 110-114 first.

At block 1008, a timing associated with each conflicting instruction is evaluated. In certain examples, if two events are scheduled with the same priority, time stamps associated with the corresponding messages can be evaluated, and the message with latest time stamp can be executed first.

At block 1010, each conflicting instruction is dispatched according to the conflict mediation. For example, a "winning", "prevailing", or "priority" instruction is provided for execution (e.g., based on agent 410 priority, instruction event priority, and/or timing, etc.), while a "losing", "delayed", or "non-priority" instruction is delayed, canceled, and/or otherwise returned to its originating agent 410.

In certain examples, at block 1012, entities can subscribe to the cloud broker 430 such that subscribers receive notification of events such as notification of changes made at the edge device 420 by a second entity to a schedule set by a first entity at the edge device 420. The first entity then knows what has been affected and can take action and/or otherwise respond accordingly.

Setpoint inquiries can periodically be sent by the control agent 410, and the cloud broker 430 respond with a corresponding setpoint so that the agent 410 can determine whether or not the setpoint is different than expected, for example. In certain examples, in response to a setpoint inquiry, the cloud broker 430 notifies the control agent 410 that its schedule may not be applied due to another schedule with higher priority on the same edge device gateway 420, so the control agent 410 is advised not to forward the schedule to the edge device 420 because the schedule will not be allowed to pass through. Then, when the edge device 420 is available, the cloud broker 430 can notify the control agent 410 to now provide its schedule, if still applicable, to the edge device 420 for execution, and the cloud broker 430 can return a response (e.g., in real time or substantially in real time given data transmission, processing, and/or storage latency) informing the control agent 410 of the success or failure of the proposed schedule, for example.

Thus, a control agent 410 can receive push notifications from the cloud broker 430 regarding activity of other agents 410. The particular agent 410 can learn from what other agents 410 are doing and whether or not their action is successful, for example. Alerts can be sent in the form of visual, audible, email, text, and/or code/instruction to the agent 410, for example.

In certain examples, individual control agent 410 schedules can be integrated into a cloud schedule administered via the cloud broker 430. By integrating individual schedules into a larger or "master" schedule, schedule conflicts can be identified and resolved so that one or more HVAC controls 110-114 can be driven via the cloud schedule and communication between the cloud broker 430 and the edge device 420, for example.

Figure 11A:
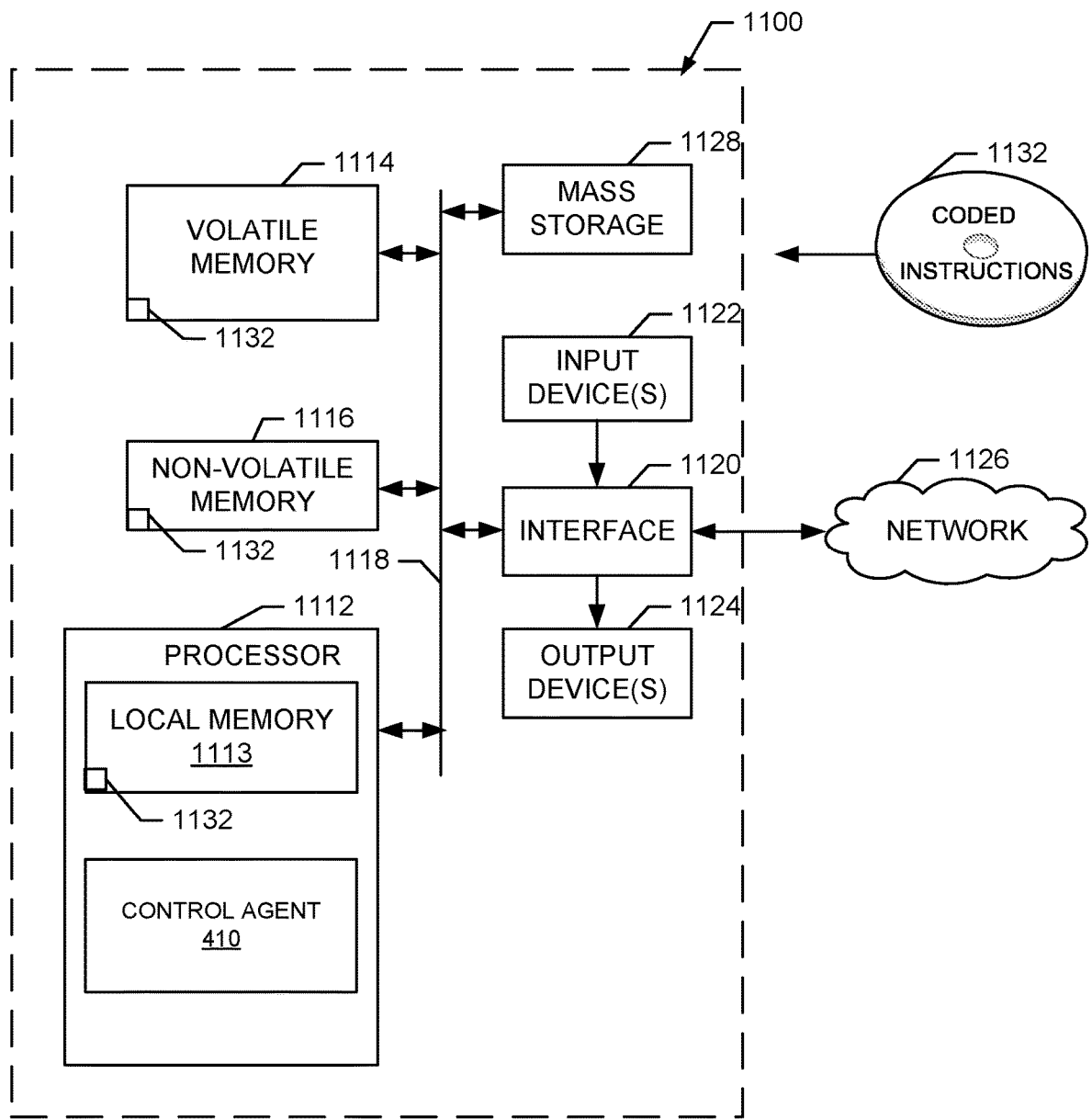
FIGS. 11A-11C are block diagrams of an example processor platform that may be used to implement the example apparatus, systems, and methods disclosed herein.
Figure 11B:
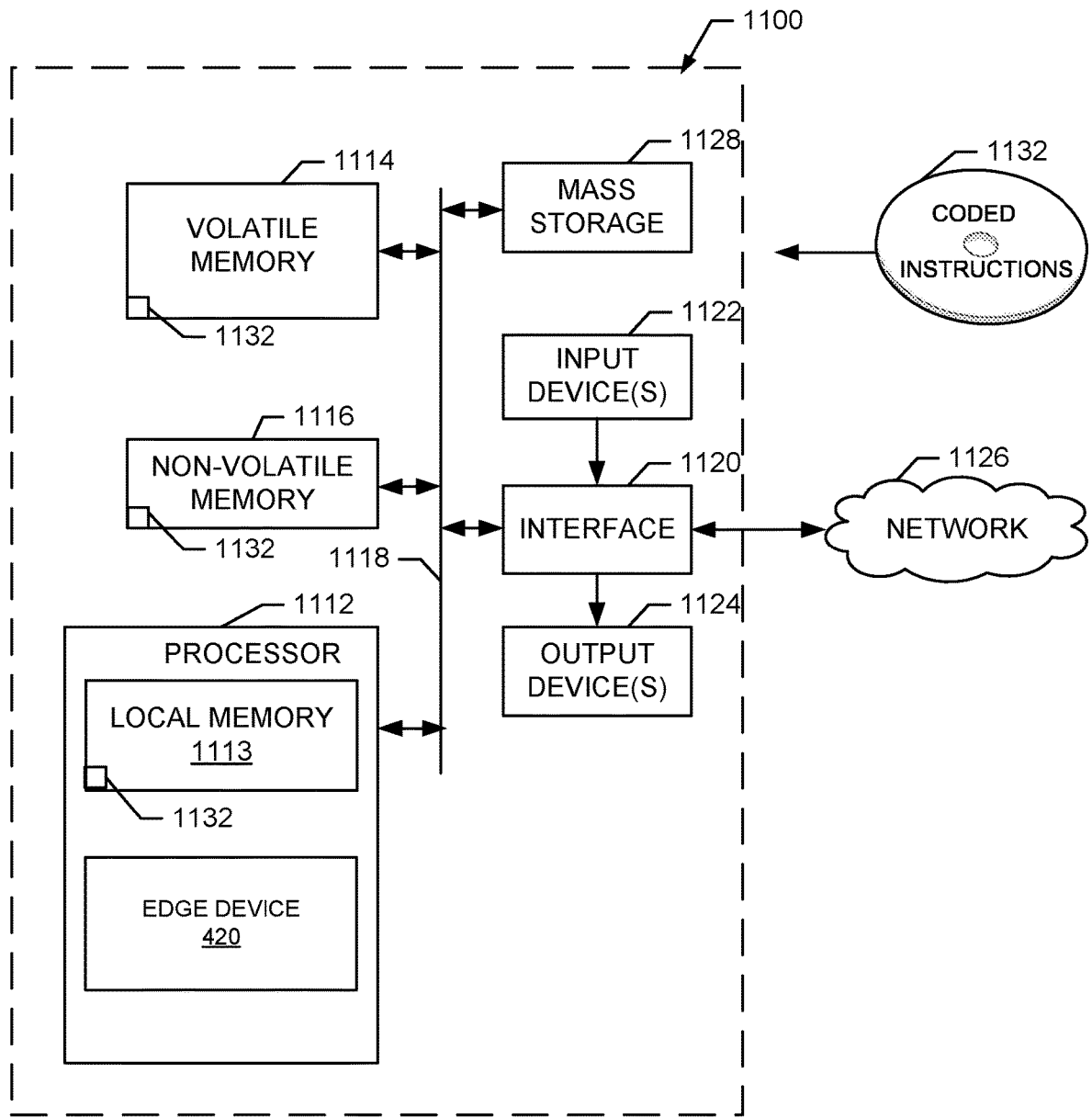
Figure 11C:
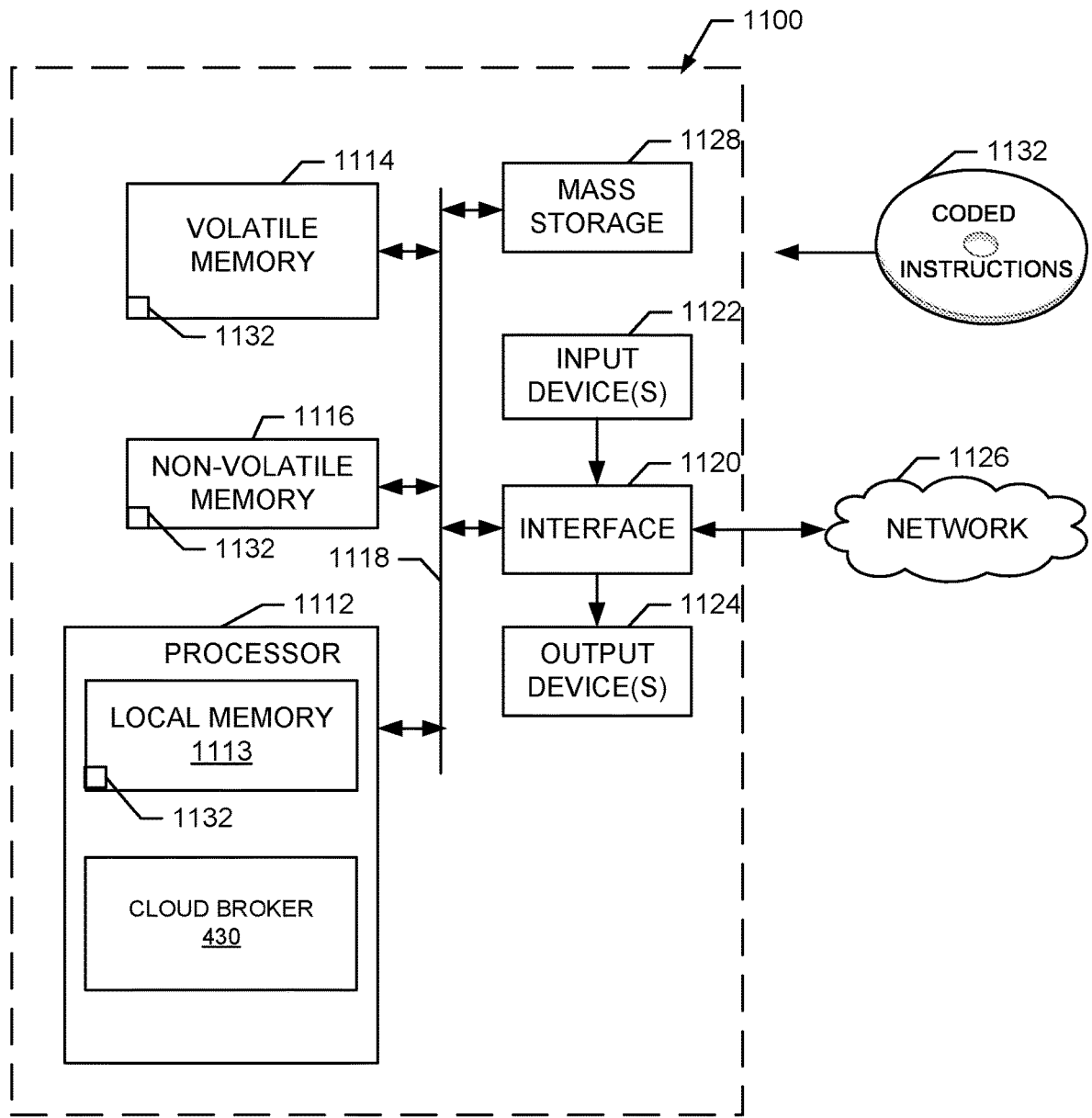

FIGS. 11A-11C show block diagrams of an example processor platform 1100 capable of executing the instructions of FIGS. 9-10 to implement the example control systems of FIGS. 1-8. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIG. 11 may be stored in the mass storage device 1128, in the volatile memory 1114, in the non-volatile memory 1116, and/or on a removable tangible computer readable storage medium such as a CD or DVD.

The subject matter of this description may be implemented as stand-alone system or for execution as an application capable of execution by one or more computing devices. The application (e.g., webpage, downloadable applet or other mobile executable) can generate various displays or graphic/visual representations as graphic user interfaces (GUIs) or other visual illustrations, which may be generated as webpages or the like, in a manner to facilitate interfacing (receiving input/instructions, generating graphic illustrations) with users via the computing device(s).

Memory and processor as referred to herein can be stand-alone or integrally constructed as part of various programmable devices, including for example a desktop computer or laptop computer hard-drive, field-programmable gate arrays (FPGAs), application-specific integrated circuits (ASICs), application-specific standard products (ASSPs), system-on-a-chip systems (SOCs), programmable logic devices (PLDs), etc. or the like or as part of a Computing Device, and any combination thereof operable to execute the instructions associated with implementing the system(s) and method(s) of the subject matter described herein. For example, as shown in FIG. 11A, the control agent 410 can be implemented using an embodiment of the processor platform 1100. Alternatively or in addition, the edge device 420 can be implemented using an embodiment of the processor platform 1100 (FIG. 11B). Alternatively or in addition, the cloud broker 430 can be implemented using an embodiment of the processor platform 1100 (FIG. 11C).

Computing device as referenced herein can include: a mobile telephone; a computer such as a desktop or laptop type; a Personal Digital Assistant (PDA) or mobile phone; a notebook, tablet or other mobile computing device; or the like and any combination thereof.

Computer readable storage medium or computer program product as referenced herein is tangible and can include volatile and non-volatile, removable and non-removable media for storage of electronic-formatted information such as computer readable program instructions or modules of instructions, data, etc. that may be stand-alone or as part of a computing device. Examples of computer readable storage medium or computer program products can include, but are not limited to, RAM, ROM, EEPROM, Flash memory, CD-ROM, DVD-ROM or other optical storage, magnetic cassettes, magnetic tape, magnetic disk storage or other magnetic storage devices, or any other medium which can be used to store the desired electronic format of information and which can be accessed by the processor or at least a portion of the computing device.

The terms module and component as referenced herein generally represent program code or instructions that causes specified tasks when executed on a processor. The program code can be stored in one or more computer readable mediums.

Network as referenced herein can include, but is not limited to, a wide area network (WAN); a local area network (LAN); the Internet; wired or wireless (e.g., optical, Bluetooth, radio frequency (RF)) network; a cloud-based computing infrastructure of computers, routers, servers, gateways, etc.; or any combination thereof associated therewith that allows the system or portion thereof to communicate with one or more computing devices.

The term user and/or the plural form of this term is used to generally refer to those persons capable of accessing, using, or benefiting from the present disclosure.

While certain examples have been described in the context of HVAC and/or other environmental system controls, certain examples involving the cloud broker can be extended to other control agent-edge device communications.

Thus, certain examples measure and process a plurality of schedules collected by the edge device and forwarded to the cloud broker. In certain examples, the edge device can validate schedule information and provide feedback (e.g., classify error into category, severity, etc.) as well as forward the information to the cloud broker. When a scheduling conflict occurs, metadata can assist in mediation and/or other resolution of the conflict. For example, a schedule author (e.g., a local contractor versus a cloud actor, etc.) can be identified to help determine who should prevail in a scheduling conflict. For example, a cloud operator may not be advisable to preempt a local contractor because the local contractor may be working to resolve a problem on the local system. Thus, metadata can help the cloud broker understand, prioritize, and/or otherwise process schedule author, source, content, conflict, etc.

In certain examples, setpoints can enhance energy consumption, set different times, values, settings, etc. The system can set a value at a first time and then measure/read back the value at a second time to evaluate how the value changed to determine next action(s). For example, rooftop HVAC units have setpoints that control the temperature according to a schedule. Certain examples provide a learning algorithm using a mediation routine as a tool to identify and learn from collisions in scheduling. Collisions can be detected and mediated by the cloud-based system in a cloud-based schedule or set of schedules, for example.

Technical effects of the subject matter described above can include, but are not limited to, identification of conflict and corresponding mediation and regulation of instructions and/or other message traffic between a plurality of control agents and an edge device associated with a target system, such as HVAC control, etc. Prior approaches have been unable to do such mediation, relying instead on a first-come, first-served random race of instructions to the edge device, which can result in missed instructions, overridden instructions, and associated erroneous or at least inefficient operation of associated systems. Certain examples provide the technical effect of alerting agents to the presence of conflicts and resolution of such conflicts, in contrast to prior systems. Certain examples provide the technical effect of instruction and/or other event subscription to enable control agent notification and planning in the face of competing schedules, setpoints, and/or other instructions. Certain examples provide a cloud schedule formed from control agent schedules through which conflicts can be handled and instructions coordinated to the edge device(s).

This written description uses examples to disclose the subject matter, and to enable one skilled in the art to make and use the invention. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a cloud broker including a processor and a memory, the memory storing a global schedule of settings for a plurality of control agents, the processor configured to at least:
      receive a first instruction from a first control agent of the plurality of control agents for an edge device, the first instruction including a first schedule of settings for a target, the target accessible via the edge device, the first schedule of settings to be applied to the target during a first time period;
      receive a second instruction from a second control agent of the plurality of control agents, the second instruction associated with a second schedule of settings for the target, the second schedule of settings to be applied to the target during a second time period;
      analyze the first instruction and the second instruction to identify a conflict between the first instruction and the second instruction, the conflict resulting from overlap during the first time period and the second time period;

when no conflict is identified, provide the first instruction to the edge device for relay to the target for execution, the first instruction including the first schedule of settings; and when a conflict is identified between the first instruction and the second instruction, i) mediate the conflict and provide an outcome of the mediation to the edge device, the outcome including a schedule free of conflicts, and ii) adjust the global schedule of settings to include the outcome of the mediation.

2. The apparatus of claim 1, wherein the processor is further configured to provide a subscription to the first control agent to receive a push notification regarding processing of instructions at the cloud broker.

3. The apparatus of claim 1, wherein the processor is further configured to generate the global schedule of settings by combining the first schedule of settings for the target from the first control agent and the second schedule of settings for the target from the second control agent.

4. The apparatus of claim 1, wherein the first schedule of settings includes a schedule of heating, ventilation, and air conditioning (HVAC) settings at the target.

5. The apparatus of claim 1, wherein the first schedule of settings includes a set point for an HVAC control system at the target.

6. The apparatus of claim 1, wherein the first schedule of settings includes a control schedule of events and metadata identifying the first control agent.

7. The apparatus of claim 1, wherein at least one of the edge device or the cloud broker is to provide feedback to the first control agent regarding disposition of the first instruction.

8. The apparatus of claim 1, wherein the edge device includes a gateway with a software plugin executing on the gateway to process instructions.

9. A non-transitory, tangible, computer-readable storage medium including instructions which, when executed by a processor of a cloud broker, cause the processor to at least:
store a global schedule of settings for at least a first control agent and a second control agent;
receive a first instruction from the first control agent for an edge device, the first instruction including a first schedule of settings for a target, the target accessible via the edge device, the first schedule of settings to be applied to the target during a first time period;
receive a second instruction from the second control agent, the second instruction associated with a second schedule of settings for the target, the second schedule of settings to be applied to the target during a second time period;
analyze the first instruction and the second instruction to identify a conflict between the first instruction and the second instruction, the conflict resulting from overlap during the first time period and the second time period;
when no conflict is identified, provide the first instruction to the edge device for relay to the target for execution, the first instruction including the first schedule of settings; and
when a conflict is identified between the first instruction and the second instruction, i) mediate the conflict and provide an outcome of the mediation to the edge device, the outcome including a schedule free of conflicts, and ii) adjust the global schedule of settings to include the outcome of the mediation.

10. The computer-readable storage medium of claim 9, wherein the processor is further configured to provide a subscription to the first control agent to receive push notification regarding processing of instructions at the cloud broker.

11. The computer-readable storage medium of claim 9, wherein the processor is further configured to generate the global schedule of settings by combining the first schedule of settings for the target from the first control agent and the second schedule of settings for the target from the second control agent.

12. The computer-readable storage medium of claim 9, wherein the first schedule of settings includes a schedule of heating, ventilation, and air conditioning (HVAC) settings at the target.

13. The computer-readable storage medium of claim 9, wherein the first schedule of settings includes a set point for an HVAC control system at the target.

14. The computer-readable storage medium of claim 9, wherein the first schedule of settings includes a control schedule of events and metadata identifying the first control agent.

15. The computer-readable storage medium of claim 9, wherein at least one of the edge device or the cloud broker is to provide feedback to the first control agent regarding disposition of the first instruction.

16. The computer-readable storage medium of claim 9, wherein the edge device includes a gateway with a software plugin executing on the gateway to process instructions.

17. A computer-implemented method comprising:
storing, at a cloud broker, a global schedule of settings for at least a first control agent and a second control agent;
receiving, at the cloud broker, a first instruction from the first control agent for an edge device, the first instruction including a first schedule of settings for a target, the target accessible via the edge device, the first schedule of settings to be applied to the target during a first time period;
receiving, at the cloud broker, a second instruction from the second control agent, the second instruction associated with a second schedule of settings for the target, the second schedule of settings to be applied to the target during a second time period;
analyzing, at the cloud broker, the first instruction and the second instruction to identify a conflict between the first instruction and the second instruction, the conflict resulting from overlap during the first time period and the second time period;
when no conflict is identified, providing, via the cloud broker, the first instruction to the edge device for relay to the target for execution, the first instruction including the first schedule of settings; and
when a conflict is identified between the first instruction and the second instruction, i) mediating, via the cloud broker, the conflict and providing an outcome of the mediation to the edge device, the outcome including a schedule free of conflicts, and ii) adjusting the global schedule of settings to include the outcome of the mediation.

18. The method of claim 17, further including providing a subscription to the first control agent to receive a push notification regarding processing of instructions at the cloud broker.

19. The method of claim 17, further including generating the global schedule of settings by combining the first schedule of settings for the target from the first control agent and the second schedule of settings for the target from the second control agent.

20. The method of claim 17, wherein the first schedule of settings includes a schedule of heating, ventilation, and air conditioning (HVAC) settings at the target.

* * * * *